UNITED STATES PATENT OFFICE.

JOHN E. LAUER, OF NEW YORK, N. Y.

IMPROVEMENT IN MANUFACTURING CRYSTALLINE ACID PHOSPHATE OF LIME FOR YEAST-POWDERS.

Specification forming part of Letters Patent No. 140,051, dated June 17, 1873; application filed February 13, 1872.

*To all whom it may concern:*

Be it known that I, JOHN E. LAUER, of the city, county, and State of New York, have invented a new Process of Manufacturing Crystalline Acid Phosphate of Lime, of which the following is a specification.

This invention is contradistinguished from my patent of February 19, 1867, No. 62,277, in which the bone-black was first treated with muriatic acid, and afterward with sulphuric acid, the result, under which process, containing sulphate of lime, which it is desirable to avoid, and is the object of my present invention; which consists in first treating the bone-black with diluted sulphuric acid, whereby the sulphate of lime is deposited, and the mass produced may be separated therefrom, to be afterwards treated with muriatic acid, and then evaporated and crystalized.

The process is performed in the following manner: One hundred (100) pounds of the bone-black of commerce are put into a wooden vessel with twenty-five (25) pounds of sulphuric acid diluted with one hundred (100) pounds of water, and stirred together until a pasty mass is produced. It will be desirable after diluting the sulphuric acid with water, and before applying it to the bone-black, to let it stand for about twenty-four hours, to allow the precipitation of any sulphate of lead that may have been in the acid before dilution, after which the diluted acid is drawn off by a siphon for use. After the mass obtained as above described from the bone black and sulphuric acid has stood for about twenty-four hours, forty-five (45) pounds of muriatic acid are added in the same vessel, and after stirring for ten or fifteen minutes, two hundred (200) pounds of water are introduced, and the whole is then stirred for five or ten minutes. The whole is now placed in a suitable filter, in which it is filtered through coarse woolen cloth or other suitable material. The filtered liquor is evaporated in glazed earthen pots at a temperature not exceeding 200° Fahrenheit to a point at which crystallization commences, and the pots are then allowed to cool that crystallization may take place. The mother liquor is separated from the crystals first by draining or filtering in any suitable filter, and afterwards by hydraulic or other mechanical pressures. The resulting mass is finally dried on shelves or frames in a room kept at a temperature of about 100° Fahrenheit, and is then a very white, perfectly dry crystalline acid phosphate of lime, containing a considerable quantity of hydrochloric acid as an essential ingredient. The crystals are permanent and non-hydroscopic under ordinary atmospheric conditions.

I claim—

The manufacture of crystalline acid phosphate of lime, substantially as herein described—that is to say, by treating bone black first with sulphuric acid and afterward with muriatic acid—in the manner and for the purpose set forth.

JNO. E. LAUER.

Witnesses:
FRED. HAYNES,
FERD. TUSCH.